(12) United States Patent
Choi et al.

(10) Patent No.: US 8,005,043 B2
(45) Date of Patent: Aug. 23, 2011

(54) METHOD AND APPARATUS FOR SCHEDULING DOWNLINK PACKETS IN A MOBILE COMMUNICATION SYSTEM

(75) Inventors: Yun-Seok Choi, Suwon-si (KR); Sung-Kwon Jo, Seoul (KR); Ki-Seob Hong, Suwon-si (KR)

(73) Assignee: Samsung Electronics Co., Ltd (KR)

( * ) Notice: Subject to any disclaimer, the term of this patent is extended or adjusted under 35 U.S.C. 154(b) by 836 days.

(21) Appl. No.: 11/969,057

(22) Filed: Jan. 3, 2008

(65) Prior Publication Data

US 2008/0159219 A1 Jul. 3, 2008

(30) Foreign Application Priority Data

Jan. 3, 2007 (KR) .................. 10-2007-0000814

(51) Int. Cl.
*H04W 4/00* (2009.01)
(52) U.S. Cl. ......................... 370/329; 370/465
(58) Field of Classification Search .......... 370/328–329, 370/336, 338, 341, 345–346, 348, 465, 466, 370/468, 400–401
See application file for complete search history.

(56) References Cited

U.S. PATENT DOCUMENTS

| | | | | |
|---|---|---|---|---|
| 6,788,687 B2 * | 9/2004 | Bao et al. | | 370/394 |
| 7,382,744 B2 * | 6/2008 | Bhushan et al. | | 370/328 |
| 7,609,671 B1 * | 10/2009 | Nuriyev et al. | | 370/328 |
| 2005/0002352 A1 * | 1/2005 | Bao et al. | | 370/328 |
| 2005/0036456 A1 * | 2/2005 | Laroia et al. | | 370/328 |
| 2005/0111397 A1 * | 5/2005 | Attar et al. | | 370/319 |
| 2005/0259613 A1 * | 11/2005 | Garudadri et al. | | 370/328 |
| 2005/0281278 A1 | 12/2005 | Black et al. | | |
| 2006/0013216 A1 * | 1/2006 | Rajkotia et al. | | 370/389 |
| 2006/0062164 A1 * | 3/2006 | Jung et al. | | 370/278 |
| 2006/0146721 A1 * | 7/2006 | Attar et al. | | 370/238 |
| 2006/0164990 A1 * | 7/2006 | Bhushan et al. | | 370/235 |
| 2006/0176881 A1 | 8/2006 | Ma et al. | | |
| 2006/0251016 A1 * | 11/2006 | Lee et al. | | 370/329 |
| 2010/0046445 A1 * | 2/2010 | Sawahashi et al. | | 370/329 |
| 2010/0118782 A1 * | 5/2010 | Baker et al. | | 370/328 |

FOREIGN PATENT DOCUMENTS

WO WO 03/055142 7/2003

* cited by examiner

*Primary Examiner* — Chi H. Pham
*Assistant Examiner* — Kevin Mew
(74) *Attorney, Agent, or Firm* — The Farrell Law Firm, P.C.

(57) ABSTRACT

A method and apparatus for scheduling downlink packets in a mobile communication system are provided, in which a BS prioritizes MSs, while accounting for types of services provided to the MSs, generates one single-user candidate transmission format and M multi-user candidate transmission formats corresponding to a DRC value received from an MS with a highest priority level, estimates per-slot effective data rates for the single-user candidate transmission format and all of the multi-user candidate transmission formats, and transmits a downlink packet in a candidate transmission format having a maximum per-slot effective data rate.

14 Claims, 5 Drawing Sheets

METHOD AND APPARATUS FOR SCHEDULING DOWNLINK PACKETS IN A MOBILE COMMUNICATION SYSTEM

PRIORITY

This application claims priority under 35 U.S.C. §119(a) to a Korean Patent Application filed in the Korean Intellectual Property Office on Jan. 3, 2007 and assigned Serial No. 2007-814, the entire disclosure of which is incorporated herein by reference.

BACKGROUND OF THE INVENTION

1. Field of the Invention

The present invention generally relates to a mobile communication system. More particularly, the present invention relates to an apparatus and method for scheduling downlink packets.

2. Description of the Related Art

Mobile communication systems are under development to provide high-speed large-data services beyond voice-focused service. A Code Division Multiple Access 2000 (CDMA 2000) 1xEvolution Data Only (1xEV-DO) system provides high-data services. A Base Station (BS) transmits a downlink signal with a maximum power and a Mobile Station (MS) measures the Carrier-to-Interference (C/I) ratio of the signal and feeds back a Data Rate Control (DRC) value corresponding to the C/I ratio to the BS. The DRC value is a data rate representing the downlink channel status of the MS.

With DRC values received from MSs, the BS selects an MS (or a flow) to which it will transmit a signal and the format of a transmission packet. The transmission packet can be a single-user packet directed to one MS or a multi-user packet directed to a plurality of MSs.

Figure 1:
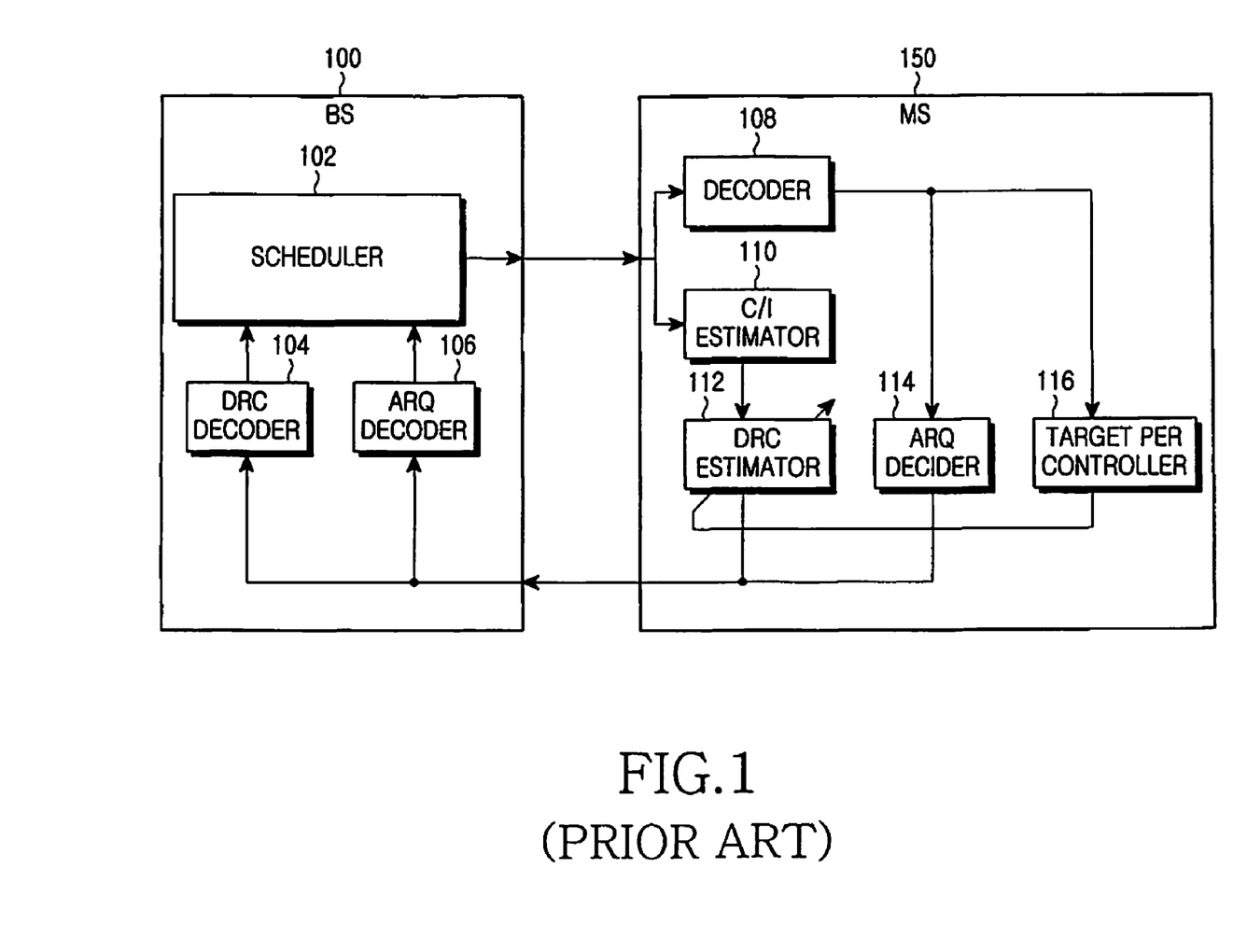
FIG. 1 is a block diagram of an apparatus for transmitting and receiving signals between a BS and an MS in a conventional CDMA 1xEV-DO communication system.

FIG. 1 is a block diagram of an apparatus for transmitting and receiving signals between a BS and an MS in a conventional CDMA 1xEV-DO communication system.

Referring to FIG. 1, upon receipt of a downlink signal from a BS 100, an MS 150 decodes the downlink signal at a decoder 108 and provides the decoded signal to an Automatic Repeat reQuest (ARQ) decider 114 and a target Packet Error Rate (PER) controller 116. The ARQ decider 114 selects an ACKnowledgment/Negative ACKnowledgment (ACK/NACK) signal for the received downlink signal and transmits the ACK/NACK signal to the BS 100. The target PER controller 116 adjusts a DRC decision threshold for a DRC decider 112, taking into account packet error information about the decoded signal, in order to determine a DRC value that satisfies a target PER of 1%.

A C/I estimator 110 estimates the C/I ratio of the downlink signal received from the BS 100. The DRC decider 112 compares the C/I ratio estimate with the DRC decision threshold, determines a DRC value that makes the downlink signal satisfy the target PER of 1%, and transmits the determined DRC value to the BS 100.

The BS 100 decodes DRC values and ACK/NACK signals received from the MS 150 and other MSs at a DRC decoder 104 and an ARQ decoder 106. A scheduler 102 performs a scheduling algorithm according to the decoding results to thereby allocate downlink resources to the MSs.

The BS uses a transmission format corresponding to a DRC value received from an MS, for transmission of a single-user packet to the MS. The preamble of the single-user packet carries information about the MS to receive the single-user packet, and the MS demodulates the packet using the transmission format corresponding to its transmitted DRC value.

The preamble of a multi-user packet provides information indicating whether this packet is a multi-user packet and information indicating a packet size. Information about a plurality of MSs is included in a Medium Access Control (MAC) header of the multi-user packet. These MSs are those that have transmitted compatible multi-user DRC values. The compatible multi-user DRC values refer to DRC values including the same multi-user transmission format in Table 1. A DRC value is a DRC index in Table 1. The compatible multi-user DRC values range from a low DRC value to a high DRC value.

Figure 2:
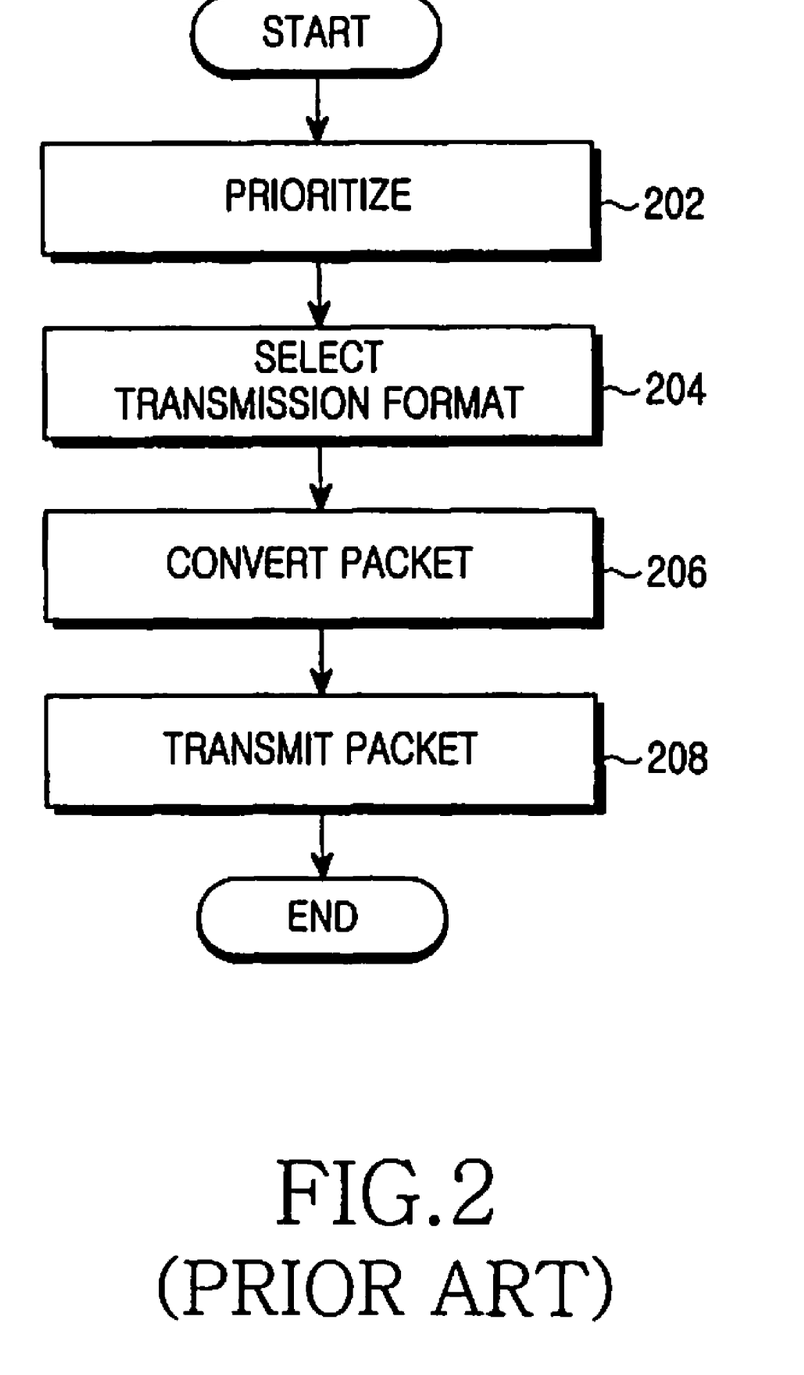
FIG. 2 is a flowchart of a downlink scheduling operation of a BS in the conventional communication system.

FIG. 2 is a flowchart of a downlink scheduling operation of a BS in a conventional communication system.

Referring to FIG. 2, the BS prioritizes MSs in step 202. For example, for a Best Effort (BE) service, the BS can prioritize the MSs by a proportional fairness algorithm. For a Quality of Service (QoS) sensitive time delay, the BS can prioritize the MSs in a descending order of time delay.

In step 204, the BS generates a plurality of candidate transmission formats for an MS according to the priority level of the MS and selects one of the candidate transmission formats, for a transmission packet. If possible, the BS converts the transmission packet to a short transmission packet in step 206 and transmits the packet in the selected transmission format to the MS in step 208.

Table 1 below lists transmission formats for a CDMA 2000 1xEV-DO Revision A communication system.

TABLE 1

| DRC index | Rate Metric (kbps) | Span (slots) | List of Associated Single-User Transmission Formats | List of Associated Multi-User Transmission Formats |
|---|---|---|---|---|
| 0x0 | 0 | 16 | (128, 16, 1024) | (128, 4, 256) |
|  |  |  | (256, 16, 1024) | (256, 4, 256) |
|  |  |  | (512, 16, 1024) | (512, 4, 256) |
|  |  |  | (1024, 16, 1024) | (1024, 4, 256) |
| 0x1 | 38.4 | 16 | (128, 16, 1024) | (128, 4, 256) |
|  |  |  | (256, 16, 1024) | (256, 4, 256) |
|  |  |  | (512, 16, 1024) | (512, 4, 256) |
|  |  |  | (1024, 16, 1024) | (1024, 4, 256) |
| 0x2 | 76.8 | 8 | (128, 8, 512) | (128, 4, 256) |
|  |  |  | (256, 8, 512) | (256, 4, 256) |
|  |  |  | (512, 16, 512) | (512, 4, 256) |
|  |  |  | (1024, 8, 512) | (1024, 4, 256) |
| 0x3 | 153.6 | 4 | (128, 4, 256) | (128, 4, 256) |
|  |  |  | (256, 4, 256) | (256, 4, 256) |
|  |  |  | (512, 4, 256) | (512, 4, 256) |
|  |  |  | (1024, 4, 256) | (1024, 4, 256) |
| 0x4 | 307.2 | 2 | (128, 2, 128) | (128, 4, 256) |
|  |  |  | (256, 2, 128) | (256, 4, 256) |
|  |  |  | (512, 2, 128) | (512, 4, 256) |
|  |  |  | (1024, 2, 128) | (1024, 4, 256) |
| 0x5 | 307.2 | 4 | (512, 4, 128) | (128, 4, 256) |
|  |  |  | (1024, 4, 128) | (256, 4, 256) |
|  |  |  | (2048, 4, 128) | (512, 4, 256) |
|  |  |  |  | (1024, 4, 256) |
|  |  |  |  | (2048, 4, 128) |
| 0x6 | 614.4 | 1 | (128, 1, 64) | (128, 4, 256) |
|  |  |  | (256, 1, 64) | (256, 4, 256) |
|  |  |  | (512, 1, 64) | (512, 4, 256) |
|  |  |  | (1024, 1, 64) | (1024, 4, 256) |
| 0x7 | 614.4 | 2 | (512, 2, 64) | (128, 4, 256) |
|  |  |  | (1024, 2, 64) | (256, 4, 256) |
|  |  |  | (2048, 2, 64) | (512, 4, 256) |
|  |  |  |  | (1024, 4, 256) |
|  |  |  |  | (2048, 4, 128) |
| 0x8 | 921.6 | 2 | (1024, 2, 64) | (128, 4, 256) |
|  |  |  | (3072, 2, 64) | (256, 4, 256) |
|  |  |  |  | (512, 4, 256) |
|  |  |  |  | (1024, 4, 256) |
|  |  |  |  | (2048, 4, 128) |
|  |  |  |  | (3072, 2, 64) |

TABLE 1-continued

| DRC index | Rate Metric (kbps) | Span (slots) | List of Associated Single-User Transmission Formats | List of Associated Multi-User Transmission Formats |
|---|---|---|---|---|
| 0x9 | 1228.8 | 1 | (512, 1, 64)<br>(1024, 1, 64)<br>(2048, 1, 64) | (128, 4, 256)<br>(256, 4, 256)<br>(512, 4, 256)<br>(1024, 4, 256)<br>(2048, 4, 128) |
| 0xa | 1228.8 | 2 | (4096, 2, 64) | (128, 4, 256)<br>(256, 4, 256)<br>(512, 4, 256)<br>(1024, 4, 256)<br>(2048, 4, 128)<br>(3072, 2, 64)<br>(4096, 2, 64) |
| 0xb | 1843.2 | 1 | (1024, 1, 64)<br>(3072, 1, 64) | (128, 4, 256)<br>(256, 4, 256)<br>(512, 4, 256)<br>(1024, 4, 256)<br>(2048, 4, 128)<br>(3072, 2, 64) |
| 0xc | 2457.6 | 1 | (4096, 1, 64) | (128, 4, 256)<br>(256, 4, 256)<br>(512, 4, 256)<br>(1024, 4, 256)<br>(2048, 4, 128)<br>(3072, 2, 64)<br>(4096, 2, 64) |
| 0xd | 1536 | 2 | (5120, 2, 64) | (128, 4, 256)<br>(256, 4, 256)<br>(512, 4, 256)<br>(1024, 4, 256)<br>(2048, 4, 128)<br>(3072, 2, 64)<br>(4096, 2, 64)<br>(5120, 2, 64) |
| 0xe | 3072 | 1 | (5120, 1, 64) | (128, 4, 256)<br>(256, 4, 256)<br>(512, 4, 256)<br>(1024, 4, 256)<br>(2048, 4, 128)<br>(3072, 2, 64)<br>(4096, 2, 64)<br>(5120, 2, 64) |

Referring to Table 1, under List of Associated Single-User Transmission Formats, transmission formats written in bold are canonical transmission formats mapped to DRC values, and the other transmission formats are for short transmission packets. Under List of Associated Multi-User Transmission Formats, transmission formats for packet sizes less than 1024 are for short transmission packets. Under List of Associated Single-User Transmission Formats and List of Associated Multi-User Transmission Formats, transmission formats are represented as (a, b, c) where "a" denotes a physical packet size, "b" denotes a slot span, and "c" denotes a preamble length.

As described above, there are no proposed techniques for specifying how a BS scheduler determines a transmission format for a downlink packet. When the BS selects MSs to receive a multi-user packet, it is inefficient for the BS to check over every MS to determine whether its DRC value includes the same multi-user DRC value.

SUMMARY OF THE INVENTION

An aspect of the present invention is to address at least the problems and/or disadvantages and to provide at least the advantages described below. Accordingly, an aspect of the present invention is to provide a method for determining a transmission format that maximizes transmission efficiency and a scheduler using the same in a mobile communication system.

Another aspect of the present invention is to provide a method for determining MSs to receive a multi-user packet and a scheduler using the same in a mobile communication system.

An aspect of the present invention provides a method for scheduling downlink packets in a BS in a mobile communication system, in which MSs are prioritized according to the types of services provided to the MSs, one single-user candidate transmission format and M multi-user candidate transmission formats corresponding to a DRC value received from an MS with a highest priority level are generated, per-slot effective data rates are estimated for the single-user candidate transmission format and all of the multi-user candidate transmission formats, and a downlink packet is transmitted in a candidate transmission format having a maximum per-slot effective data rate.

Another aspect of the present invention provides an apparatus for scheduling downlink packets in a BS in a mobile communication system, in which an MS selector selects an MS with a highest priority level, a candidate transmission format generator generates one single-user candidate transmission format and M multi-user candidate transmission formats corresponding to a DRC value received from the MS with the highest priority level, a minimum DRC decider determines a minimum DRC value for the single-user candidate transmission format and each of the multi-user candidate transmission formats, a per-slot effective data rate calculator estimates per-slot effective data rates for the single-user candidate transmission format and all of the multi-user candidate transmission formats, a candidate transmission format selector selects a candidate transmission format having a maximum per-slot effective data rate, and a packet converter converts data corresponding to the selected candidate transmission format to short packets and transmits the short packets.

BRIEF DESCRIPTION OF THE DRAWINGS

The above and other objects, features and advantages of certain exemplary embodiments of the present invention will be more apparent from the following detailed description taken in conjunction with the accompanying drawings, in which.

DETAILED DESCRIPTION OF PREFERRED EMBODIMENTS

The matters defined in the description such as a detailed construction and elements are provided to assist in a comprehensive understanding of preferred embodiments of the invention with reference to the accompanying drawings.

Throughout the drawings, the same drawing reference numerals will be understood to refer to the same elements, features and structures. Accordingly, those of ordinary skill in the art will recognize that various changes and modifications of the embodiments described herein can be made without departing from the scope and spirit of the invention. Also, descriptions of well-known functions and constructions are omitted for clarity and conciseness.

Preferred embodiments of the present invention provide an apparatus and method for determining a transmission format that maximizes transmission efficiency in a scheduler in a mobile communication system. The scheduler can select MSs (or flows) to receive a multi-user packet. The scheduler may reside in a BS and a flow means a service flow. Hereinbelow, the terms MS and flow are used interchangeably.

Figure 3:
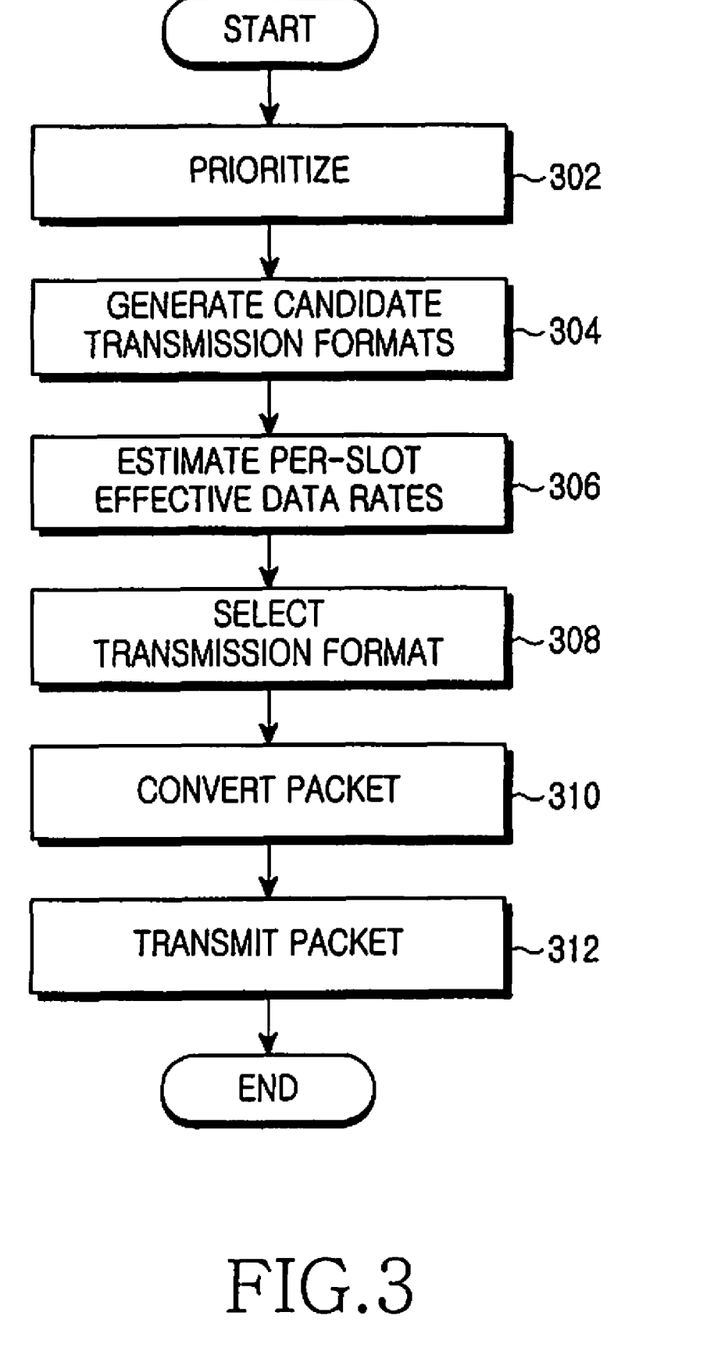
FIG. 3 is a flowchart of an operation for scheduling downlink packets in a BS in a mobile communication system according to an exemplary embodiment of the present invention.

FIG. 3 is a flowchart of an operation for scheduling downlink packets in a BS in a mobile communication system according to an exemplary embodiment of the present invention.

Referring to FIG. 3, a BS scheduler prioritizes all MSs that the BS scheduler is servicing in step 302. For a BE service, the BS can prioritize the MSs by a proportional fairness algorithm. For a time delay-sensitive QoS service, the BS can prioritize the MSs in a descending order of time delay. The prioritization is not described herein in detail because it is beyond the scope of the present invention.

In step 304, the BS scheduler creates a single-user candidate transmission format corresponding to a DRC value received from an MS with the highest priority level and creates M multi-user candidate transmission formats for all Multi-User DRC (MUDRC) values corresponding to the received DRC value. In Table 1, the DRC value is a DRC index and the MUDRC values corresponding to the DRC value are all multi-user transmission formats corresponding to the DRC value.

Aside from short packets with physical packet sizes less than 1024, the number of multi-user candidate transmission formats, M, can be a number from 1 to 5 according to the DRC value. For example, if the DRC value of the highest-priority MS is 0xb, there are three multi-user transmission formats excluding three short transmission formats, for 0xb in Table 1. Three multi-user transmission formats {(1024, 4, 256), (2048, 4, 128), (3072, 2, 64)} are multi-user candidate transmission formats, which can be expressed as MUDRC values {0x3, 0x5, 0x8}.

In step 306, the BS scheduler estimates a per-slot effective data rate based on channel status, for each of the M+1 candidate transmission formats by Equation (1).

$$\text{Est\_Rate}(i) = \frac{\text{Effective\_Bit\_Size}(i)}{\text{Estimated\_Span}(i)}, \text{ for } i = 1, \ldots, M+1 \quad (1)$$

where Est_Rate(i) denotes an estimated per-slot effective data rate for an $i^{th}$ transmission format. If i is 1, Est_Rate denotes the estimated per-slot effective data rate of the single-user candidate transmission format, and if i is 2 to M+1, Est_Rate denotes the estimated per-slot effective data rate of a multi-user candidate transmission format. Effective_Bit_Size(i) denotes the bit size of data transmitted in the $i^{th}$ transmission format. Estimated_Span(i) denotes an estimated number of slots to be transmitted to an MS in the poorest channel status, when the $i^{th}$ transmission format is used, because the number of slots to be transmitted in a candidate transmission format depends on an MS in the poorest channel status.

Let MinDRC denote a DRC value fed back from the MS in the poorest channel status. Then, Estimated_Span(i) is computed by Equation (2).

$$\text{Estimated\_Span}(i) = \text{Slot\_Span}(i), \text{ for } i = 1 \quad (2)$$

$$\text{Estimated\_Span}(i) = \frac{\text{Slot\_Span}(i)}{R(\text{MinDRC}(i))/R(\text{DRC}(i))},$$

$$\text{for } i = 2, \ldots, M+1$$

where Slot_Span(i) denotes the number of slots for the $i^{th}$ transmission format, R(MinDRC(i)) denotes the rate metric of the MS with MinDRC among MSs associated with the $i^{th}$ transmission format, R(DRC(i)) denotes the rate metric of an MS with the DRC value mapped to the $i^{th}$ transmission format. As there is at least one transmission slot, if Estimated_Span(i) is less than 1, Estimated_Span(i) is set to 1. For the single-user candidate transmission format, MinDRC is equal to DRC. Hence, Estimated_Span(i) is the number of slots for the $i^{th}$ transmission format.

If R(MinDRC(i))/R(DRC(i)) is greater than 1, the rate metric of the MS in the poorest channel status with respect to the $i^{th}$ transmission format is greater than the rate metric of the $i^{th}$ transmission format. Therefore, decoding is completed before all slots of the $i^{th}$ transmission format are transmitted, thus causing early termination. Consequently, Estimated_Span(i) becomes less than Slot_Span(i). In the opposite case, if R(MinDRC(i))/R(DRC(i)) is less than 1, the rate metric of the MS in the poorest channel status is less than the rate metric of the $i^{th}$ transmission format. Therefore, decoding can be completed after all slots of the $i^{th}$ transmission format are transmitted.

In step 308, the BS scheduler selects a transmission format with the highest per-slot effective data rate Est_Rate. If Est_Rate(1) is equal to the highest of Est_Rate(2) to Est_Rate(M+1), the BS selects the single-user candidate transmission format. If possible, the BS scheduler converts a transmission packet to short packets in step 310 and transmits the packets in the selected transmission format in step 312.

Figure 4:
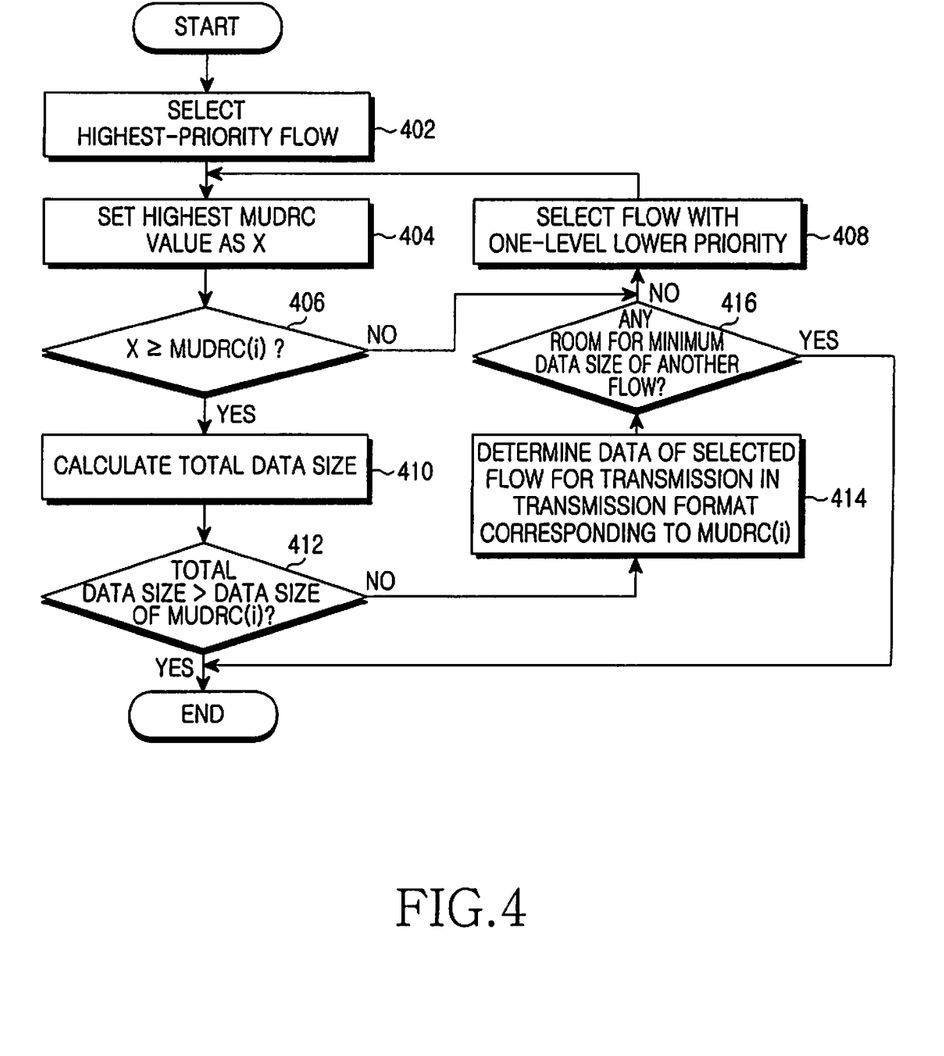
FIG. 4 is a flowchart of an operation for generating a multi-user transmission format in the BS in the mobile communication system according to an exemplary embodiment of the present invention.

FIG. 4 is a flowchart of an operation for generating a multi-user transmission format in the BS in the mobile communication system according to a preferred embodiment of the present invention.

Referring to FIG. 4, the BS selects a flow with the highest priority level in step 402. Flows can be distinguished by MSs or services. In step 404, the BS sets the highest of MUDRC values corresponding to a DRC fed back from a selected MS to X. For example, if the DRC value is 0xb, the MUDRC values for the DRC value are {0x3, 0x5, 0x8} and the highest MUDRC value is 0x8. The BS determines whether the selected MS has an MUDRC compatible with MUDRC(i) by comparing X with MUDRC(i) in step 406. MUDRC(i) is a DRC mapped to an $i^{th}$ multi-user candidate transmission format and i ranges from 2 to M+1. If X is greater than MUDRC(i), the BS adds the data size of the selected flow to the data size of all previously selected flows, thus determining a total size of transmission data in step 410.

In step 412, the BS compares the total data size with the data size of MUDRC(i), which is the size of a MAC packet represented by the multi-user transmission format corresponding to MUDRC(i). If the total data size exceeds the data size of MUDRC(i), the BS ends the multi-use transmission format generation. If the total data size is less than or equal to the data size of MUDRC(i), the BS determines to transmit the data of the selected flow in the transmission format corresponding to MUDRC(i) in step 414. In step 416, the MS determines whether there is room for a minimum data size of another flow in the transmission format to be generated. If the minimum data size of another flow cannot be accommodated, the BS ends the multi-user transmission format generation. If there is room for the minimum data size of another flow, the BS selects a flow with a one level-lower priority in step 408 and returns to step 404.

Figure 5:
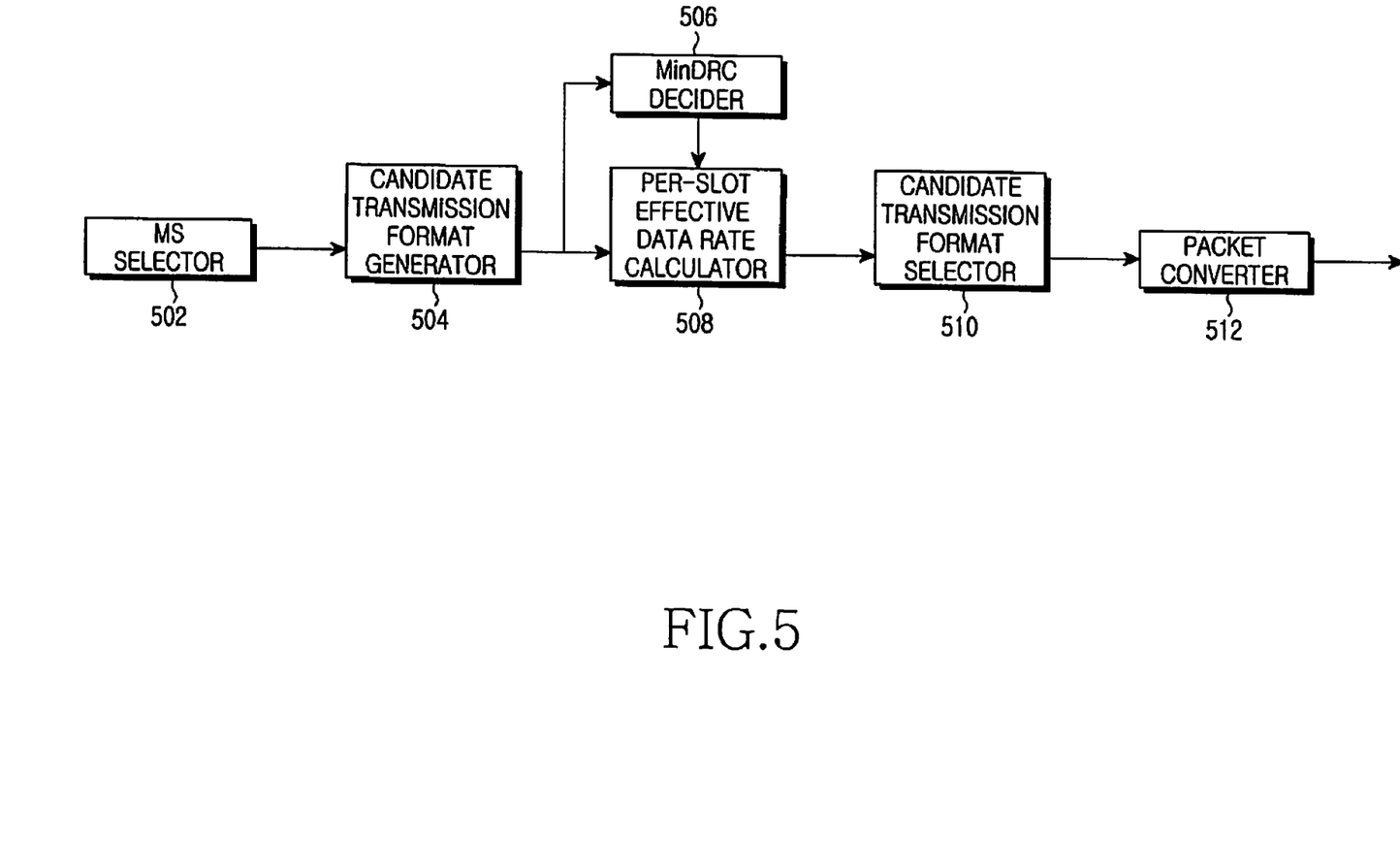
FIG. 5 is a block diagram of a scheduler in the mobile communication system according to an exemplary embodiment of the present invention.

FIG. 5 is a block diagram of the scheduler in the mobile communication system according to an exemplary embodiment of the present invention.

Referring to FIG. 5, an MS selector 502 selects an MS with the highest priority level and notifies a candidate transmission format generator 504 of the selected MS. The candidate transmission format generator 504 generates candidate transmission formats corresponding to a DRC value received from the selected MS and notifies a MinDRC decider 506 and a per-slot effective data rate calculator 508. The candidate transmission formats are one single-user candidate transmission format and a plurality of multi-user candidate transmission formats corresponding to the DRC value.

The MinDRC decider 506 determines MinDRC for every candidate transmission format. The per-slot effective data rate calculator 508 calculates the per-slot effective data rate of every candidate transmission format using MinDRC received from the MinDRC decider 506 by Equation (1) and Equation (2). A candidate transmission format selector 510 selects a candidate transmission format with the highest of the per-slot effective data rates received from the per-slot effective data rate calculator 508 and notifies a packet converter 512 of the selected candidate transmission format. The packet converter 512 converts a packet corresponding to the selected transmission format to a short transmission packet. The packet in a finally selected transmission format is transmitted to a receiver after channel encoding and modulation.

As is apparent from the above description, the present invention advantageously increases data transmission efficiency by providing an apparatus and method for determining a transmission format that maximizes a per-slot effective data rate in a mobile communication system. Also, the present invention generates a multi-user transmission format with a reduced complexity.

While the invention has been shown and described with reference to certain exemplary embodiments of the present invention thereof, it will be understood by those skilled in the art that various changes in form and details may be made therein without departing from the spirit and scope of the present invention as defined by the appended claims and their equivalents.

What is claimed is:

1. A method for scheduling downlink packets in a Base Station (BS) in a mobile communication system, comprising:
  prioritizing Mobile Stations (MSs) while accounting for types of services provided to the MSs;
  generating one single-user candidate transmission format and M multi-user candidate transmission formats corresponding to a Data Rate Control (DRC) value received from an MS with a highest priority level;
  estimating per-slot effective data rates for the single-user candidate transmission format and all of the multi-user candidate transmission formats; and
  transmitting a downlink packet in a candidate transmission format having a maximum per-slot effective data rate.

2. The method of claim 1, wherein the DRC value represents a downlink channel status between the BS and the MS.

3. The method of claim 1, wherein the per-slot effective data rates estimation comprises estimating the per-slot effective data rates Est_Rate by:

$$\text{Est\_Rate}(i) = \frac{\text{Effective\_Bit\_Size}(i)}{\text{Estimated\_Span}(i)}, \text{ for } i = 1, \ldots, M+1$$

where Est_Rate(i) denotes an estimated per-slot effective data rate for an $i^{th}$ transmission format; if i is 1, Est_Rate denotes the estimated per-slot effective data rate of the single-user candidate transmission format; and if i is 2 to M+1, Est_Rate denotes the estimated per-slot effective data rate of a multi-user candidate transmission format, Effective_Bit_Size(i) denotes a bit size of data transmitted in the $i^{th}$ transmission format, Estimated_Span(i) denotes an estimated number of slots to be transmitted to an MS in a poorest channel status, when slots are transmitted in the $i^{th}$ transmission format.

4. The method of claim 3, wherein Estimated_Span(i) is defined as:

$$\text{Estimated\_Span}(i) = \text{Slot\_Span}(i), \text{ for } i = 1$$

$$\text{Estimated\_Span}(i) = \frac{\text{Slot\_Span}(i)}{R(\text{Min}DRC(i))/R(DRC(i))},$$

$$\text{for } i = 2, \ldots, M+1$$

where Slot_Span(i) denotes the number of slots for the $i^{th}$ transmission format, MinDRC denotes a DRC value fed back from an MS in the poorest channel status, R(MinDRC(i)) denotes a rate metric of an MS with MinDRC among MSs associated with the $i^{th}$ transmission format, and R(DRC(i)) denotes a rate metric of an MS with the DRC value corresponding to the $i^{th}$ transmission format.

5. The method of claim 1, wherein if the per-slot effective data rate of the single-user candidate transmission format is equal to a highest per-slot effective data rate of the multi-user candidate transmission formats, the transmission comprises transmitting the downlink packet in the single-user candidate transmission format.

6. The method of claim 1, wherein the generation of the M multi-user candidate transmission formats comprises:
  setting as a first variable a highest of Multi-User DRC (MUDRC) values corresponding to a DRC value received from an MS selected in an order of priority level;
  if it is determined, using the first variable, that the MS has an MUDRC value compatible with an MUDRC value corresponding to a current multi-user candidate transmission format, determining a total data size of transmission data; and
  if the total data size exceeds a data size that the multi-user candidate transmission format can accommodate, ending generation of the multi-user candidate transmission format.

7. The method of claim 6, wherein the total data size determination comprises adding a data size for the selected MS to a data size for a previously selected MS.

8. An apparatus for scheduling downlink packets in a Base Station (BS) in a mobile communication system, comprising:
  an MS selector for selecting a Mobile Station (MS) with a highest priority level;
  a candidate transmission format generator for generating one single-user candidate transmission format and M multi-user candidate transmission formats corresponding to a Data Rate Control (DRC) value received from the MS with the highest priority level;

a minimum DRC decider for determining a minimum DRC value for the single-user candidate transmission format and each of the multi-user candidate transmission formats;

a per-slot effective data rate calculator for estimating per-slot effective data rates for the single-user candidate transmission format and all of the multi-user candidate transmission formats;

a candidate transmission format selector for selecting a candidate transmission format having a maximum per-slot effective data rate; and a packet converter for converting a data packet corresponding to the selected candidate transmission format to a short transmission packet.

9. The apparatus of claim 8, wherein the DRC value represents a downlink channel status between the BS and the MS.

10. The apparatus of claim 8, wherein the per-slot effective data rate calculator estimates the per-slot effective data rates Est_Rate by:

$$\text{Est\_Rate}(i) = \frac{\text{Effective\_Bit\_Size}(i)}{\text{Estimated\_Span}(i)}, \text{ for } i = 1, \ldots, M+1$$

where Est_Rate(i) denotes an estimated per-slot effective data rate for an $i^{th}$ transmission format; if i is 1, Est_Rate denotes the estimated per-slot effective data rate of the single-user candidate transmission format; and if i is 2 to M+1, Est_Rate denotes the estimated per-slot effective data rate of a multi-user candidate transmission format, Effective_Bit_Size(i) denotes a bit size of data transmitted in the $i^{th}$ transmission format, Estimated_Span(i) denotes an estimated number of slots to be transmitted to an MS in a poorest channel status, when slots are transmitted in the $i^{th}$ transmission format.

11. The apparatus of claim 10, wherein Estimated_Span(i) is defined as:

$$\text{Estimated\_Span}(i) = \text{Slot\_Span}(i), \text{ for } i = 1$$

$$\text{Estimated\_Span}(i) = \frac{\text{Slot\_Span}(i)}{R(\text{MinDRC}(i))/R(\text{DRC}(i))},$$

$$\text{for } i = 2, \ldots, M+1$$

where Slot_Span(i) denotes the number of slots for the $i^{th}$ transmission format, MinDRC denotes a DRC value fed back from an MS in the poorest channel status, R(MinDRC(i)) denotes the rate metric of an MS with MinDRC among MSs associated with the $i^{th}$ transmission format, and R(DRC(i)) denotes a rate metric of an MS with the DRC value corresponding to the $i^{th}$ transmission format.

12. The apparatus of claim 8, wherein if the per-slot effective data rate of the single-user candidate transmission format is equal to a highest per-slot effective data rate of the multi-user candidate transmission formats, the candidate transmission format selector selects the single-user candidate transmission format.

13. The apparatus of claim 8, wherein the candidate transmission format generator sets as a first variable a highest of Multi-User DRC (MUDRC) values corresponding to a DRC value received from an MS selected in an order of priority level, if it is determined using the first variable that the MS has an MUDRC value compatible with an MUDRC value corresponding to a current multi-user candidate transmission format, determines a total data size of transmission data, and if the total data size exceeds a data size that the multi-user candidate transmission format can accommodate, ends generation of the multi-user candidate transmission format.

14. The apparatus of claim 13, wherein the candidate transmission format generator calculates the total data size determination by adding a data size for the selected MS to a data size for a previously selected MS.

\* \* \* \* \*